US009042679B2

(12) United States Patent
Zuliani et al.

(10) Patent No.: US 9,042,679 B2
(45) Date of Patent: May 26, 2015

(54) PROJECTION-BASED IMAGE REGISTRATION

(75) Inventors: Marco Zuliani, Los Gatos, CA (US); Kevin L. Hunter, Sunnyvale, CA (US); Jianping Zhou, Fremont, CA (US); Todd Sachs, Palo Alto, CA (US); Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 425 days.

(21) Appl. No.: 13/489,778

(22) Filed: Jun. 6, 2012

(65) Prior Publication Data
US 2013/0329070 A1    Dec. 12, 2013

(51) Int. Cl.
*G06K 9/32* (2006.01)
*G06T 7/00* (2006.01)
*H04N 5/232* (2006.01)

(52) U.S. Cl.
CPC ..... *G06T 7/0026* (2013.01); *G06T 2207/20021* (2013.01); *G06T 2207/20068* (2013.01); *H04N 5/23254* (2013.01); *H04N 5/23258* (2013.01)

(58) Field of Classification Search
USPC .................. 382/294, 295, 168, 171, 174, 218
See application file for complete search history.

(56) References Cited

U.S. PATENT DOCUMENTS

| 4,582,995 A * | 4/1986 | Lim et al. ................. 250/363.07 |
| 6,628,845 B1 * | 9/2003 | Stone et al. .................... 382/294 |
| 6,728,395 B1 * | 4/2004 | Kage et al. ..................... 382/107 |
| 2007/0236579 A1 * | 10/2007 | Li et al. ..................... 348/208.99 |
| 2009/0310872 A1 * | 12/2009 | Sibiryakov et al. ........... 382/232 |

* cited by examiner

*Primary Examiner* — Yon Couso
(74) *Attorney, Agent, or Firm* — Wong, Cabello, Lutsch, Rutherford & Brucculeri, LLP

(57) ABSTRACT

Systems, methods, and computer readable media to register images in real-time and that are capable of producing reliable registrations even when the number of high frequency image features is small. The disclosed techniques may also provide a quantitative measure of a registration's quality. The latter may be used to inform the user and/or to automatically determine when visual registration techniques may be less accurate than motion sensor-based approaches. When such a case is detected, an image capture device may be automatically switched from visual-based to sensor-based registration. Disclosed techniques quickly determine indicators of an image's overall composition (row and column projections) which may be used to determine the translation of a first image, relative to a second image. The translation so determined may be used to align/register the two images.

39 Claims, 8 Drawing Sheets

PROJECTION-BASED IMAGE REGISTRATION

BACKGROUND

This disclosure relates generally to the field of digital image processing and, more particularly, to various techniques to align or register successive images in a stream of images.

In general image registration refers to the process of adjusting a first image relative to a second image so that the two are aligned in the region in which they overlap (e.g., rotation scaling and translation, as well as affine and fully projective operations). One situation in which image registration is important is during the creation of panoramic images. To create a panoramic image, a user/photographer sweeps or translates their image capture device over a single scene. Assuming there is at least a minimum amount of overlap between successively captured images, such a stream of captured images may be used to generate a panoramic image. Images may be captured automatically or through the manual action of a user. Illustrative image capture devices include, but are not limited to, stand-alone cameras (e.g., digital single-lens reflex cameras) and those embedded in other devices such as mobile telephones, personal computers (e.g., desktop, notebook, and tablet computer systems), music playback devices, and personal digital assistants.

SUMMARY

In one embodiment a method to register digital images is provided. The method includes obtaining first and second images (each having rows and columns of pixels). After image acquisition, row and column projections for the first image and a row and column projections for the second image may be determined. Based, at least partially, on these values x- and y-offsets for the second image (relative to the first image) may be determined. The x- and y-offsets may then be used to register the second image with the first image. Computer executable program code to implement this method may be stored in any suitable non-transitory storage device. Such computer executable code may, in turn, be incorporated in substantially any electronic device capable of obtaining digital images.

In another embodiment, a method to register digital images along a specified axis is provided. After acquiring first and second images, each image may be partitioned into a plurality of blocks (each block in the first image having a corresponding block in the second image). For each block pair, quantitative quality-of-registration and projection-based registration parameters (as described above) may be determined. As used here, a "block pair" describes a block from the first image and its corresponding block from the second image. Weighted histograms may be generated based on the quantitative quality-of-registration and projection-based registration parameters just determined. A translation estimator along the specified axis may be generated from the weighted histograms and used to register the two images along the specified axis. Computer executable program code to implement this method may also be stored in any suitable non-transitory storage device. Such computer executable code may, in turn, be incorporated in substantially any electronic device capable of obtaining digital images.

In yet another embodiment, a method to register two images using, at least in part, sensor output is disclosed (e.g., accelerometer or gyroscopic sensor output). In this implementation, after obtaining two images and determining their row and column projections (see above) for each image, an x-offset (y-offset) may be determined based, at least partially, the row (column) projections of the two images. The y-offset (x-offset) may then be determined by obtaining sensor input indicative of a translation along the y-axis (x-axis). A transform operation based on prior determined offset values may be used to adjust this value to one that more closely reflects the translation occurring along the y-axis (x-axis) between the time the first and second images were captured. The projection-based and sensor-based offsets may then be used to register the second image with the first image. Computer executable program code to implement this third method may also be stored in any suitable non-transitory storage device and incorporated in substantially any electronic device capable of obtaining digital images.

DETAILED DESCRIPTION

This disclosure pertains to systems, methods, and computer readable media for implementing image registration techniques that work in real-time and are capable of producing reliable registrations even when the number of high frequency image features is small (i.e., in cases where traditional techniques are more likely to fail). In addition, a quantitative measure of the registration's quality is provided. The latter may be used to inform the user, to automatically determine when visual registration techniques may be less accurate than sensor-based approaches, and/or to automatically switch from visual-based to sensor-based registration. In general, quickly determined indicators of an image's overall composition (referred to as row and column projections) are obtained and used to determine the translation of a second image, relative to a first image. The translation so determined may be used to align the two images. The described operations may be repeated for each pair of successively captured images in a stream of images of a common scene.

In the following description, for purposes of explanation, numerous specific details are set forth in order to provide a thorough understanding of the inventive concept. As part of this description, some of this disclosure's drawings represent structures and devices in block diagram form in order to avoid obscuring the invention—the operation of such blocks being known to those of ordinary skill. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of image registration and processing systems having the benefit of this disclosure.

Figure 1:
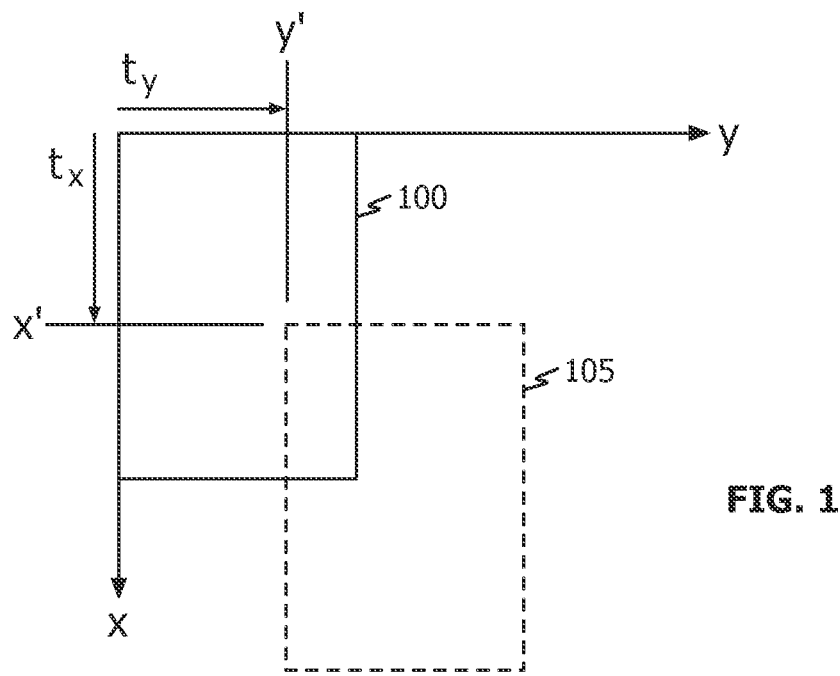
FIG. 1 shows a pictograph of two images undergoing registration in accordance with one embodiment.

Referring to FIG. 1, registration techniques in accordance with this disclosure seek to estimate an x-translation value $t_x$ and a y-translation value $t_y$ between two images 100 and 105. Registration is then the process of moving image 105 by an amount $t_x$ along the x-axis and an amount $t_y$ along the y-axis so as to align one edge of image 105 at x' and a second edge at y'. This relationship may be expressed as:

$$\begin{bmatrix} x' \\ y' \end{bmatrix} = \begin{bmatrix} x - t_x \\ y - t_y \end{bmatrix}, \qquad \text{EQ. 1}$$

such that
I(x, y)=I'(x', y')=I'(x−$t_x$, y−$t_y$), where I( ) represents the image, prime quantities (e.g., I', x' and y') are relative to image 105 (the image being registered with image 100), and $t_x$ and $t_y$ represent those offsets identified in FIG. 1.

Figure 2:
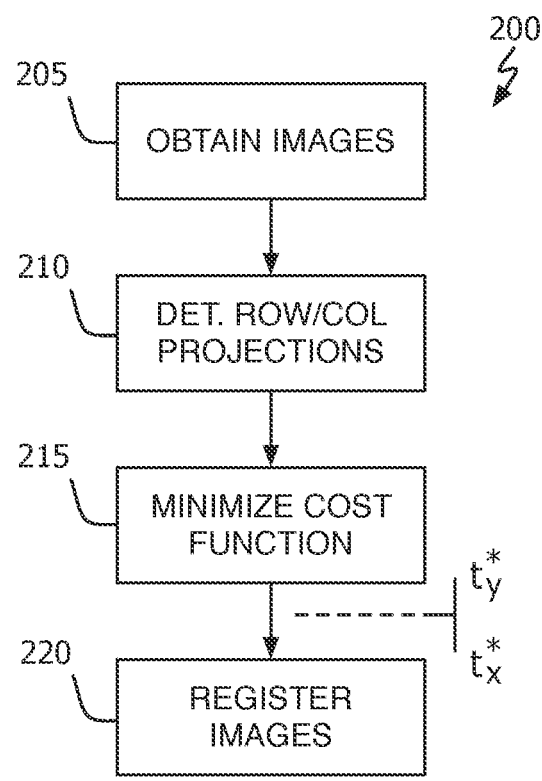
FIG. 2 shows, in flowchart form, an image registration operation in accordance with one embodiment.

Referring to FIG. 2, registration operation 200 in accordance with one embodiment begins by obtaining two images (block 205). These images may comprise the luminance or luma channel (Y) of images represented in the YUV colorspace (e.g., in a YUV 4:2:0 format). Once obtained, row and column projections for each image may be determined (block 210). As discussed more fully below, row and column projections are indicative of an image's overall composition along the projection's axis (the y-axis for column projections and the x-axis for row projections, see FIG. 1). The determined row and column projections may then be used to minimize a cost function (block 215). In one embodiment, the selected cost function identifies those translations (estimated translations $t^*_x$ and $t^*_y$) that shift a second image, relative to a first image, the least amount possible while obtaining alignment of the most similar pixel values between the two images. With $t^*_x$ and $t^*_y$ determined, the two images may be registered by moving the second image an amount along the x-axis corresponding to $t^*_x$ and an amount along the y-axis corresponding to $t^*_y$ (block 220).

Figure 3:
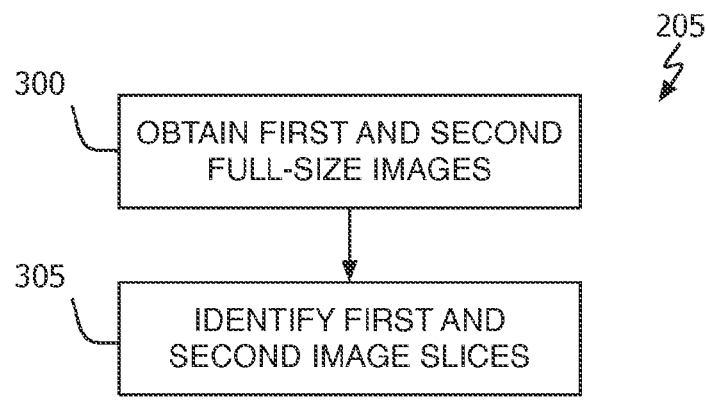
FIG. 3 show, in flowchart form, an image acquisition operation in accordance with one embodiment.

Referring to FIG. 3, image acquisition operation 205 in one embodiment may include obtaining full-size images (block 300) from which specified portions (or slices) are selected (block 305). Each of the image slices may then be passed to row and column generation operation 210 of FIG. 2.

Figure 4:
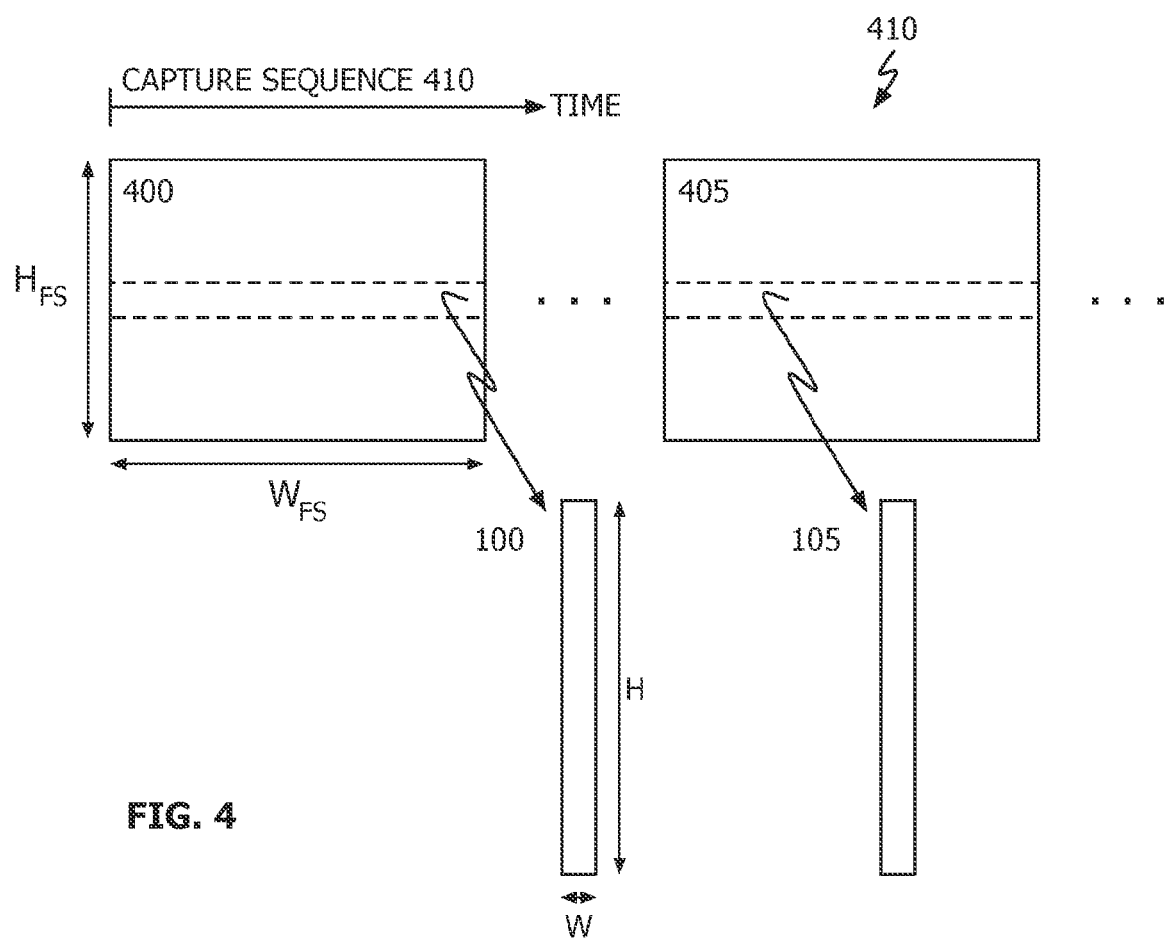
FIG. 4 illustrates an image stream in accordance with one embodiment.

Referring to FIG. 4 and as noted above with respect to FIG. 3, images 100 and 105 may represent slices from larger images 400 and 405 taken from image stream 410. In one embodiment, full-size images 400 and 405 have a height $H_{FS}$ of 1936 pixels and a width $W_{FS}$ of 2592 pixels (corresponding to a 5 Mpix image), while image slices 100 and 105 have a height H of 2592 pixels and a width W of 240 pixels. (Note: for convenience, the coordinate system of image slices 100 and 105 has been rotated 90 degrees with respect to the coordinate system of full-size images 400 and 405.) In another embodiment, full-size images 400 and 405 may be 1200-by-1600 pixels (corresponding to a 2 Mpix image), while image slices 100 and 105 are 1600-by-200 pixels. While the precise aspect ratio may depend upon factors such as the feature content in the overlapping regions, in general it has been found that aspect ratios greater that 5:1 are acceptable.

Image 405 may represent the second, third, fourth, fifth, . . . image captured after image 400. This latter approach may be appropriate when consecutive images in image stream 410 are captured rapidly compared to the image capture device's translation across a scene. For example, if an image capture device generates a 15, 20 or 30 frames-per-second (fps) image stream and the device is panned slowly across a scene, there may be sufficient overlap to permit proper registration using every nth captured image. This permits all images between the first and nth images to be ignored. This can substantially increase the device's apparent registration throughput.

It should be understood that while images 100 and 105 have been shown as being selected from the central portion of their respective full-size image, this is not necessary: images 100 and 105 may be selected from any designated region of their corresponding full-size image. It should also be understood that the height and width measures identified above are illustrative in nature. The precise image size processed during registration operation 200 is a detail that may vary from one implementation to another. It should further be noted that identification of, for example, image 100 does mean that image 400 is cropped (i.e., discarded except for image slice 100). In one embodiment, for example, after placing a full-size image into a memory, identification of an image slice may be performed by providing registration operation 200 with a memory pointer that is offset from the full-size image's memory pointer. In another embodiment however, the full-size image may be cropped. In these implementations, that portion of memory allocated to a full-size image except for the identified image slice may be used for other purposes once the image slice has been identified.

In one embodiment row and column projections may be determined in accordance with block 210 as follows:

$$\text{Row Projection } \Pi_R(x) = \sum_{y=0}^{W-1} f(Y(x, y)), \qquad \text{EQ. 2}$$

$$\text{Column Projection } \Pi_C(y) = \sum_{x=0}^{H-1} f(Y(x, y)), \qquad \text{EQ. 3}$$

where W represents image width, H represents image height, $f( )$ represents a pre-filtering operation, and Y(x, y) represents the luminance component of the pixel located at the xth-row and yth column in the image. While color channel (chroma) information may also be used, it has been found that factors such as the subsampling scheme used in typical images and the richer information content provided by the luma channel makes using luminance preferable. In an embodiment in which the image is 2592-by-240 pixels, W may be 240 and H 2592 pixels (see FIG. 4). In another embodiment, pre-filter function $f(\ )$ may be any filter suitable to the images being processed (including the identity function). For example, pre-filter function $f(\ )$ may smooth the projection to reduce the effect of noise.

Figure 5A:
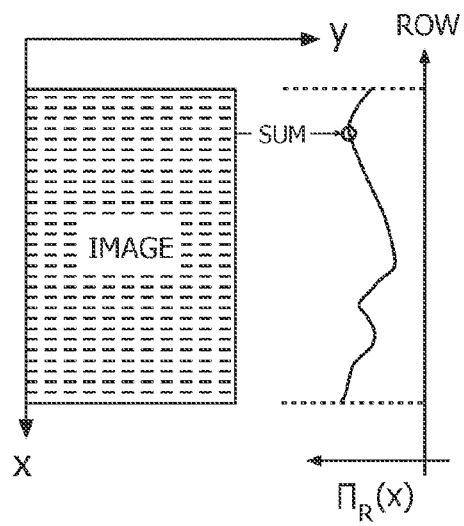
FIGS. 5A and 5B graphically illustrate an image's row and column projections in accordance with one embodiment.
Figure 5B:
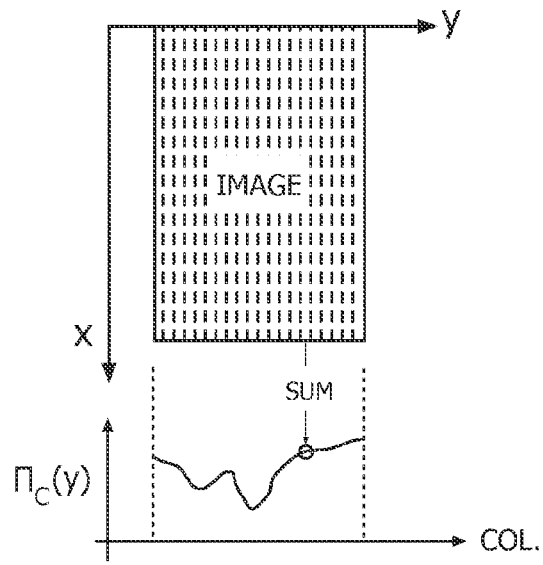

Referring to FIG. 5A and EQ. 2 above, row projection $\Pi_R(x)$ represents the "signal" or "signature" of an image's pixel (luma) values summed on a row-by-row basis. Referring to FIG. 5B and EQ. 3 above, in like fashion column projection $\Pi_C(y)$ represents the "signal" or "signature" of an image's pixel (luma) values summed on a column-by-column basis.

Continuing the example begun above, row and column projections for image 100 may be given by EQS. 2 and 3 respectively. Similarly, row and column projections for image 105 may be given as:

$$\Pi_R(x') = \sum_{y'=0}^{W-1} f(Y(x', y')), \quad \text{EQ. 4}$$

and $$\Pi_C(y') = \sum_{x'=0}^{H-1} f(Y(x', y')), \quad \text{EQ. 5}$$

where prime quantities (e.g., x' and y') identify the quantities as being based on, or relative to the "second image," image 105 (the image being registered with image 100), It has been determined empirically that using projections of the gradients of an image's luma values yields more accurate translation estimators (e.g., $t^*_y$ and $t^*_x$). It will be recognized that, in general, the computation of such gradients is resource intensive in terms of processor time and/or memory usage. Unexpectedly, it has been discovered that the row projection of the partial x derivative of the luma (needed to compute the image's gradient) is the derivative of the row projection of the luma. Similarly, column projection of the partial y derivative of the luma (needed to compute the gradient) is the derivative of the column projection of the luma. It is therefore possible to avoid the direct computation of gradients for the images being registered and instead compute only the gradients of the row and column projections. This, in turn, may be accomplished simply by taking the derivative of each projection—an operation that is both fast and light on memory use.

Figure 6:
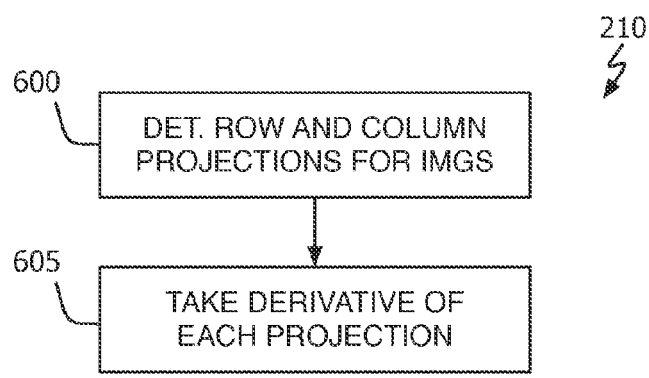
FIG. 6 shows, in flowchart form, a projection generation operation in accordance with one embodiment.

In light of these findings, row and column generation 210 may be enhanced as shown in FIG. 6. As shown there, once "raw" row and column projections for each of the images are determined (block 600), the derivative of each may be taken to produce gradients of the individual projections (605). As noted above, the resulting values are equivalent to taking the gradient of the images.

In one embodiment, translation estimators $t^*_x$ and $t^*_y$ may be determined by minimizing cost functions having the following form:

$$J(t_x) = \int_{t_{min}(t)}^{t_{max}(t)} |g(\Pi_C(z)) - g(\Pi'_c(z + t_x))| \, dz \quad \text{EQ. 6}$$

and $$J(t_y) = \int_{t_{min}(t)}^{t_{max}(t)} |g(\Pi_R(z)) - g(\Pi'_R(z + t_y))| \, dz, \quad \text{EQ. 7}$$

where $g(\ )$ is a post-process filter and may, for example, represent a low-pass or running average smoothing filter operation. Stated differently, $t^*_x$ is that value of $t_x$ that minimizes the value of $J(t_x)$/EQ. 6 and $t^*_y$ is that value of $t_y$ that minimizes the value of $J(t_y)$/EQ. 7.

In general, translation estimators may be found through an exhaustive search through all possible pixel offsets between two projections (row or column). While it is possible to perform this operation in real-time, it has been found that evaluating EQS. 6 and 7 through a specified subset of the possible offsets yields high quality results. In one embodiment, evaluating locations ±40 pixels from the current location has proven useful. In another embodiment, evaluating −10% to +70% of the available pixels along the direction of motion has also proven to yield quality results. (Here, a "minus" value refers to pixels in a direction opposite that of the device's motion from the current pixel and a "plus" value refers to pixels in the same direction as that of the device's motion. Since the value for 't' changes for each step evaluated during cost function minimization, this effects a "sliding window" as the two (row or column) projections slide across one another. It is further noted that in one embodiment, image borders may be ignored (avoiding the problems associated with boundary conditions) but doing so generally requires a follow-on normalization operation (see below).

As the projections slip across one another during the process of identifying minima of EQS. 6 and 7, the resulting estimator ($t^*_x$ or $t^*_y$) becomes based on fewer and fewer samples. The effect of this is to introduce a bias in the resulting minimized cost function value. In one embodiment this effect may be mitigated by normalizing EQS. 6 and 7 as follows:

$$J(t_x) = \frac{\int_{t_{min}(t)}^{t_{max}(t)} |g(\Pi_C(z)) - g(\Pi'_c(z + t_x))| \, dz}{\int_{t_{min}(t)}^{t_{max}(t)} |g(\Pi_C(z)) + g(\Pi'_c(z + t_x))| \, dz}, \quad \text{EQ. 8}$$

and $$J(t_y) = \frac{\int_{t_{min}(t)}^{t_{max}(t)} |g(\Pi_R(z)) - g(\Pi'_R(z + t_y))| \, dz}{\int_{t_{min}(t)}^{t_{max}(t)} |g(\Pi_R(z)) + g(\Pi'_R(z + t_y))| \, dz}. \quad \text{EQ. 9}$$

Here, the denominator ensures that the dynamic range of the costs $J(t_x)$ and $J(t_y)$ are comparable for different values of t (or, equivalently, for integration intervals with different lengths). In addition, in one embodiment the function $g(\ )$ may perform smoothing and, in this case, may depend upon the size of the function's running average smoothing filter (which helps to cope with noisy projections) and the interval boundaries $[t_{min}(t), t_{max}(t)]$.

In another embodiment, illumination discontinuities between images such as those that may be caused by changes in image capture parameters (e.g., those parameter values driven by changing sensor input) may be mitigated by removing fixed changes to an image's projection. In one such embodiment, row and column projections as defined by EQS. 2 and 3 (and also by EQS. 4 and 5) may be reformulated as follows:

$$\overline{\Pi}_R(x) = \frac{\Pi_R(x) - \mu_x}{\sigma_x} = \frac{\sum_{y=0}^{W-1} f(Y(x,y)) - \mu_x}{\sigma_x} \quad \text{EQ. 10}$$

and $$\overline{\Pi}_C(y) = \frac{\Pi_C(y) - \mu_y}{\sigma_y} = \frac{\sum_{x=0}^{H-1} f(Y(x,y)) - \mu_y}{\sigma_y}, \quad \text{EQ. 11}$$

where $\mu_x$ and $\sigma_x$ represent the mean and standard deviation of an image's row projection's values, and $\mu_x$ and $\sigma_y$ represent the mean and standard deviation of an image's column projection's values and may be determined for each value of tin the range [$t_{min}$(t), $t_{max}$(t)] The process of removing fixed changes to an image's row and column projections, is defined herein as "whitening."

In still another embodiment, external information regarding an image capture device's motion may be used to aid registration operation 200. Illustrative sources of this type of information include, but are not limited to, gyroscopic sensors and accelerometers. While these types of motion information are generally less precise for image registration purposes than the visual-based approaches described herein, they may nevertheless be valuable in predicting the device's motion. Any motion determined in accordance with prior described methodologies that deviates substantially from such an estimate may be deemed untrustworthy and given less weight. A cost function appropriate to this approach may be expressed as follows:

$$J(x) = J(x) + \lambda(t_x - t_{\tilde{x}})^2, \text{ and} \quad \text{EQ. 12}$$

$$J(y) = J(y) + \lambda(t_y - t_{\tilde{y}})^2, \quad \text{EQ. 13}$$

where J( ) represents a generic cost function, λ( ) represents a selected weighting function (in the example of EQS. 12 and 13, a parabolic function), $t_{\tilde{x}}$ represents a predicted x-axis translation provided by a secondary source, and $t_{\tilde{y}}$ represents a predicted y-axis translation provided by the secondary source.

In practice, EQS. 12 and 13 tell us that if the translation determined in accordance with one or more of the methods described above (i.e., $t_x$ and $t_y$) matches that "estimated" motion provided by, for example, sensors (i.e., $t_{\tilde{x}}$ and $t_{\tilde{y}}$), then function λ( ) has no effect. On the other hand, the more the calculated translations $t_x$ and $t_y$ differ from the predicted translations $t_{\tilde{x}}$ and $t_{\tilde{y}}$, the less likely the particular calculated translations will be identified as "minimum" values. Cost function J( ) in accordance with EQS. 12 and 13 may include any of those functions described in EQS. 6-9, and may further employ row and column projections as defined in any of EQS. 2-5, 10 or 11. Estimator function λ( ) may be any function that tends to increase in value the further the predicted value is from the selected $t_x$ or $t_y$ value.

With translation estimators $t^*_x$ and $t^*_y$ determined, quantitative measures of the resulting registration may be determined. A first such measure, referred to as the Minimum Shallowness metric, is based on the observation that a translation is likely to be non-ambiguous when the corresponding minimum of the cost function J( ) verifies at least one of the following two conditions: (1) the cost has a global minimum; and (2) the absolute distance between the cost function's smallest minimum (occurring at t*) and the second smallest minimum (occurring at t) is "large" when compared to the cost function's dynamic range. Under these conditions, and where the value $|J(t^{}) - J(t^*)|/(J_{max}() - J_{min}())$ determines what is "large," a Minimum Shallowness quality metric may be defined as follows:

$$Q_{MS} = \begin{cases} 1.0 & \text{if } t^* \text{ is the only minimum of } J() \\ \frac{|J(t^{**}) - J(t^*)|}{J_{max}() - J_{min}()} & \text{if more than one local minimum exist} \\ 0.0 & \text{if no local minima exist,} \end{cases} \quad \text{EQ. 14}$$

where $J_{max}()$ and $J_{min}()$ denote the maximum and minimum values of the cost function respectively in the interval of interest. In the embodiment described herein, EQ. 14 generates two values, one for the x-axis estimator $t^*_x$ and one for the y-axis estimator $t^*_y$.

A second quality metric, referred to as the Information Content metric, evaluates how much a projection "departs" from a known relationship (e.g., a linear, or straight line, relationship). This approach is based on the observation that two projections that resemble a common regular shape (e.g., a straight line) will not generally provide enough information content to generate a stable minimum when determined in accordance with, for example, the cost functions J( ) given by EQS. 6-9 and 12.

While more complex models, such as those provided through orthogonal regressors may be used, in one embodiment the Information Content metric may be determined by fitting a line to each projection by means of a linear regression. Let $l(t) = \beta t + \alpha$ be the line that fits the projection Π(t), and $\epsilon(t) = |l(t) - \Pi(t)|$ be the fitting residual at the translation t. The Information Content metric may then be defined as the minimum of the variance of the residuals:

$$Q_{IC} = \min\left\{\frac{1}{N}\sum_{t=t_{min}}^{t_{max}} \epsilon(t)^2, \frac{1}{N}\sum_{t=t_{min}}^{t_{max}} \epsilon'(t)^2\right\}, \quad \text{EQ. 15}$$

where N represents number of estimators generated (i.e., the number of $t^*_x$ or $t^*_y$ values), $t_{min}$ is the minimum y-axis estimator value and $t_{max}$ is the maximum y-axis estimator value determined in accordance with, for example, EQS. 7, 9 or 13. In the embodiment described herein, EQ. 15 generates two values, one corresponding to the row projections $\Pi_R$ (x) and $\Pi_R$ (x'), and one corresponding to the column projections $\Pi_C$ (y) and $\Pi_C$ (y).

It is often preferable to have a single quality metric value. In these cases the metric values generated in accordance with EQS. 14 and 15 may be combined. For example, if a conservative approach to introducing registration errors is taken, the minimum quality metric value may be chosen:

$$\text{MIN}|Q_{MS}(),Q_{IC}()|, \quad \text{EQ. 16}$$

where $Q_{MS}()$ represents all of the calculated Minimum Shallowness metric values and $Q_{IC}()$ represents all of the calculated Information Content metric values.

In another embodiment, the mean or average value of the different quality metric values may be used. In other embodiments, the different quality metric values may be combined in any manner that makes sense for the implementation in which they are used. For example, if for some reason the Minimum Shallowness metric is deemed to be more robust, the Minimum Shallowness values may be weighted more than the Information Content metric values. Further, if one axis is more significant than another, the axis deemed more important may be given more weight than the other axis (across both metric value types). It will be recognized that the methods discussed here may be combined with one another.

It has been determined that the presence of moving objects in the images being registered can severely bias the estimators $t^*_x$ and $t^*_y$. As a consequence, the final (panoramic) image can exhibit registration artifacts that could be easily perceived by a user. More specifically, projection-based registration methodologies as described herein may be subject to the influence of inconsistently moving objects in the overlapping regions of the images being registered. As used here, the phrase "inconsistently moving object" refers to an object that does not move in the same direction as the apparent motion of the dominant objects in the scene.

Recall, images 100 and 105 exhibit large aspect ratios (that is, their height is significantly larger than their width). Adopting the conventions illustrated in FIGS. 1 and 3, in an embodiment where full-size images 400 and 405 are 5 Mpix, images 100 and 105 may have 2592 pixels over which estimator $t^*_x$ is determined. In contrast, the same embodiment may use only 240 pixels over which estimator $t^*_y$ is determined. As such, inconsistent motion along the x-axis (generally perpendicular to the direction of the device's motion) does not tend to introduce significant errors as there are a large number of pixels over which such motion may be "averaged" out. Due to the relatively low number of pixels over which estimator $t^*_y$ is determined, however, inconsistent motion along the y-axis (generally along the direction of the device's motion) can introduce significant errors in estimator $t^*_y$.

In cases where moving objects are present, estimator $t^*_y$ in accordance with EQS. 7, 9 or 13 may be advantageously replaced with an approach which explicitly compensates for such motion.

Figure 7:
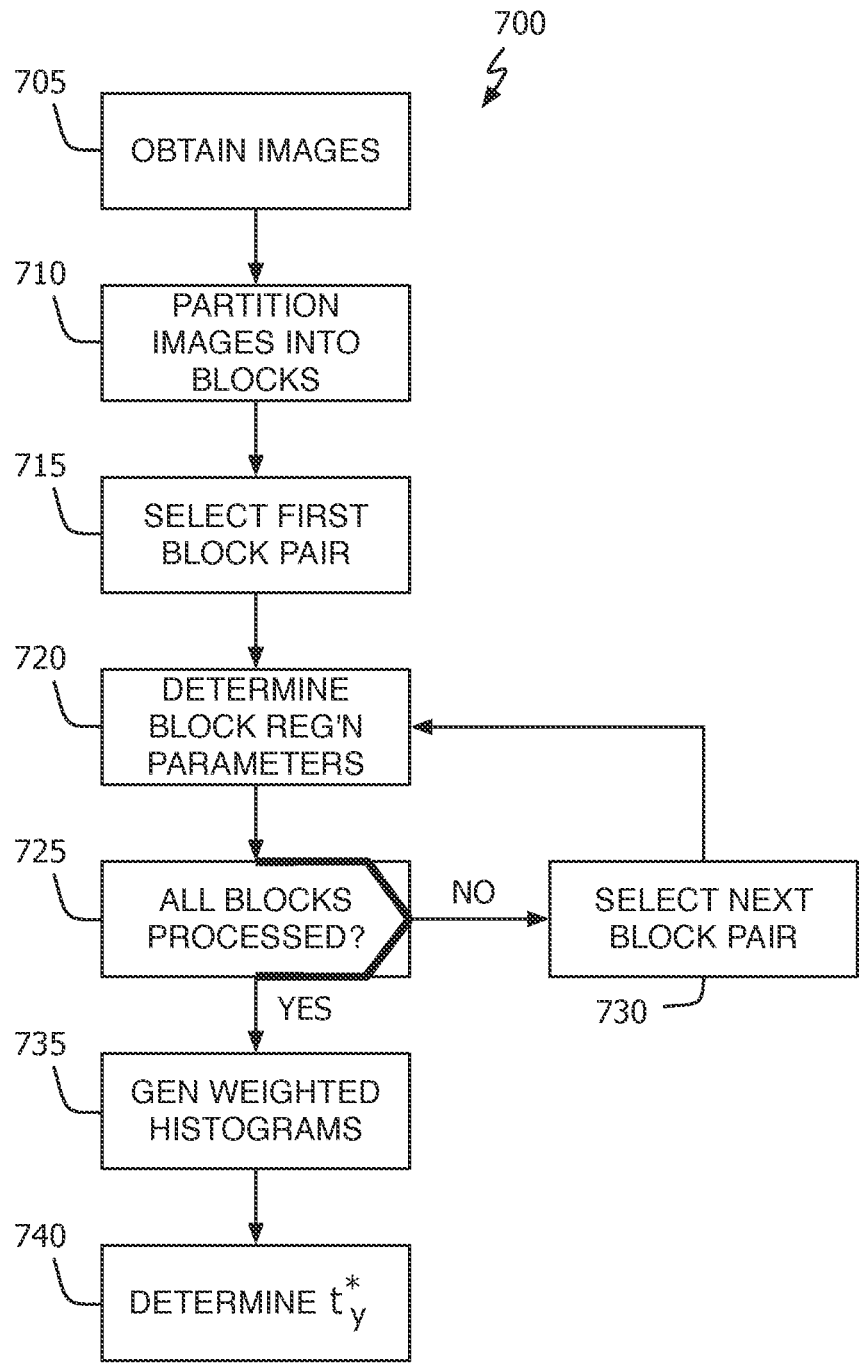
FIG. 7 shows, in flowchart form, a translation estimation operation in accordance with one embodiment.

Referring to FIG. 7, motion-aware y-axis estimator operation 700 begins by obtaining two images (block 705). For example, the two images may be those whose x-axis estimator $t^*_x$ was determined in accordance with one of EQS. 6, 8 or 12. Each of the images may then be partitioned into B overlapping vertical blocks (block 710).

Figure 8:
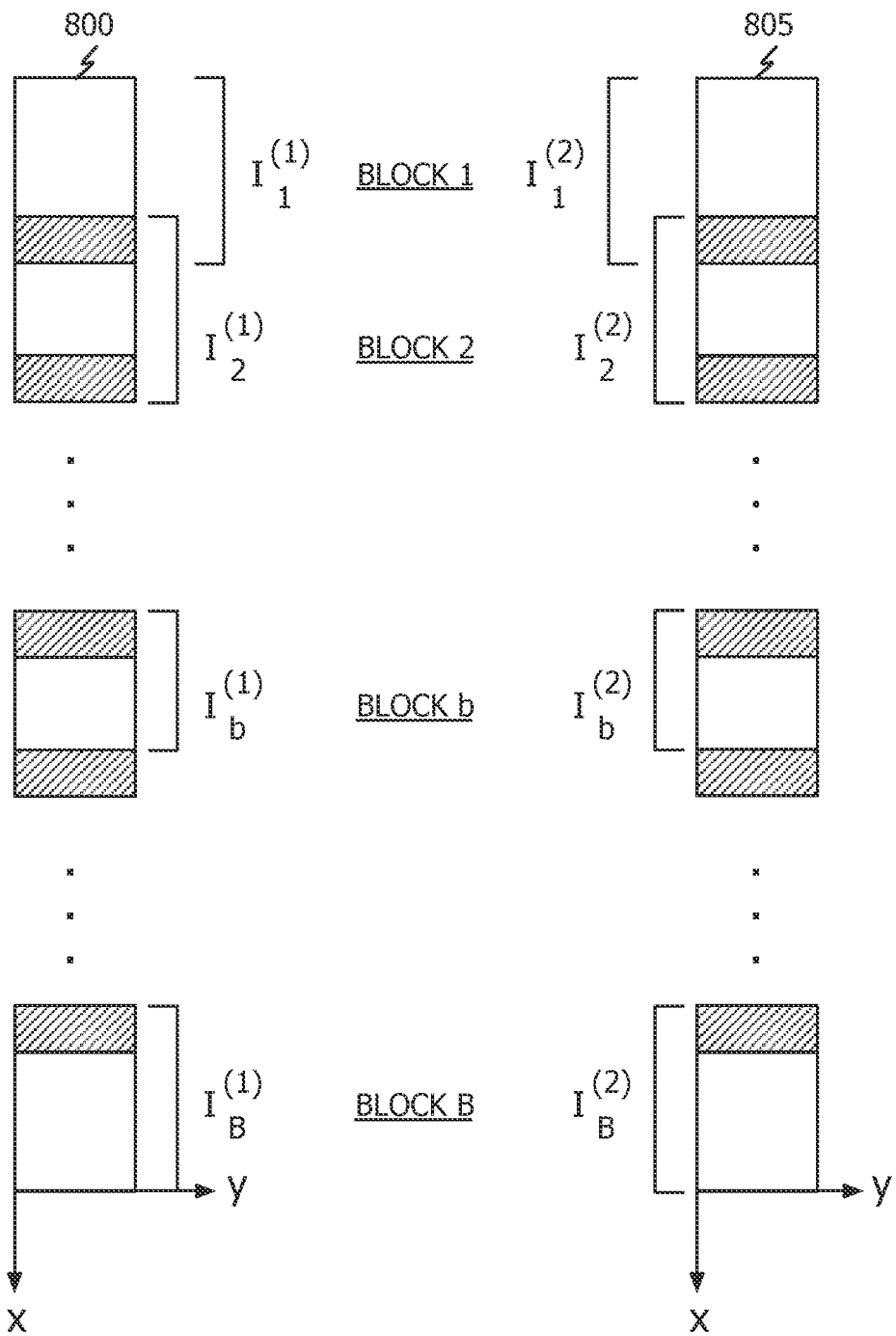
FIG. 8 shows image partitioning in accordance with one embodiment.

Referring to FIG. 8, each of first and second images 800 and 805 may be partitioned into B blocks: $I_1^{(1)}$ and $I_1^{(2)}$ (block 1); $I_2^{(1)}$ and $I_2^{(2)}$ (block 2); ... $I_b^{(1)}$ and $I_b^{(2)}$ (block b); ... and $I_B^{(1)}$ and $I_B^{(2)}$ (block B). The amount of overlap (identified by diagonal hashing), may be set in accordance with a value $p_o$ which may be virtually any value between 0 and 1. In one embodiment, $p_o$ may be 0.5 (i.e., a 50% overlap). In another embodiment, $p_o$ may be 0.25 (i.e., a 25% overlap). In practice $p_0$ is chosen to provide sufficient overlap between adjacent blocks to permit quality registrations. The size or number of blocks chosen may be implementation specific. In general, if the blocks are made too small there will not be sufficient overlap to generate accurate registration parameters (see discussion below) while blocks that are too large are more likely to contain moving objects (the very feature operation 700 seeks to minimize). In general, the number of blocks should be large enough so that some are certain not to contain a moving object. Continuing the 5 Mpix image example begun above, B equals 10, giving each block an aspect ratio of approximately 260-by-240 (approximately 1:1).

Referring again to FIG. 7, a first pair of corresponding blocks from each image is chosen (block 715), e.g., blocks $I_1^{(1)}$ and $I_1^{(2)}$, and registration parameter $t_{y,1}$ and quality metric $q_1$ determined in accordance with, for example, EQS. 7, 9, and 13-16 (block 720). If not all of the block-pairs have been processed in accordance with block 720 (the "NO" prong of block 725), the next block-pair may be chosen (block 730), e.g., $I_b^{(1)}$ and $I_1^{(2)}$, where after processing continues at block 720 where $t_{y,b}$ and quality metric $q_b$ may be determined. If all B block pairs have been processed (the "YES" prong of block 725), weighted histograms may be generated based on the registration parameters determined in accordance with block 720 (block 735). From the weighted histograms y-axis estimator $t^*_y$ may be found (block 740).

Referring to block 735, for each block pair a histogram bin index ($n_i$) may be determined in accordance with:

$$n_i = \left\lfloor \frac{t_{y,i} - t_{y,min}}{t_{y,max} - t_{y,min}} \Delta t_y \right\rfloor,$$ EQ. 17 where $t_{y,i}$ is the y-axis estimator for the ith block pair, $t_{y,min}$ and $t_{y,max}$ represent the minimum and maximum $t_y$ values identified during block 720, and $\Delta t_y$ represents the selected bin-width. Continuing the example begun above, $\Delta t_y$ may be 8 (each bin in the weighted histograms represents an 8 pixel translation quantization). It may be noted that the total number of bins in the weighted histogram may given by:

$$N = \text{floor}\left(\frac{t_{y,max} - t_{y,min}}{\Delta t_y}\right),$$ EQ. 18 where the floor( ) represents the mathematical floor function. In the case where $n_i = N$, the value of $n_i$ may be replaced with (N−1) and thereafter $0 \le n_i \le (N−1)$.

Once the bin value $n_i$ is available, it may be used to update two histograms (referenced here as they may be instantiated as arrays):

$$H_1[n_i] \leftarrow H_1[n_i] + q_i,$$ and EQ. 19

$$H_2[n_i] \leftarrow H_2[n_i] + (q_i \times t_{y,i}).$$ EQ. 20

Referring to block 740, an initial step in determining $t^*_y$ is to identify the peak value of histogram $H_1$ (whose values represent the quality of the translation $t_y$ for each block pair). The bin in which the peak value of histogram $H_1$ is given by:

$$h_1^* = \arg\max_{0 \le i \le N-1} H_1[i].$$ EQ. 21

Determination of $h^*_1$ is equivalent to determining which block pair produced the most reliable y-axis translation value. In the presence of moving objects, histogram $H_1$ may be multimodal. It is also likely that the largest peak corresponds to a translation for the overall images that should have yielded similar translation values for a larger number of blocks. Finally, y-axis estimator $t^*_y$ may be given as:

$$t^*_y = \frac{H_2[h_1^*]}{H_1[h_1^*]}.$$ EQ. 22

It is noted that the operation of determining a value for EQ. 22 is equivalent to determining the weighted mean of all the translation values that fall within histogram bin $h^*_1$.

As an aside, it should be noted that translation estimator operation 700 may also be used to determine x-axis translations. For large aspect ratio images it has been found that the computational overhead needed to evaluate EQ. 22 does not provide an x-axis estimator ($t^*_x$) that is better than that provided by, for example, EQS. 6, 8 or 12.

In those instances where cost function J( ) is monotonically increasing or decreasing, meaning there is no local minima, projection-based registration as described herein may not provide acceptable registration results. Similarly, if one or more quality metrics in accordance with EQS. 14-16 indicate the estimated translations are untrustworthy (i.e., a minimum acceptable registration quality is not met), projection-based registration may not provide acceptable registration results. When this occurs, another means of estimating device translation may need to be invoked. Fortunately, many modern image capture devices include one or more motion detectors (e.g., gyroscopes, accelerometers, compass and GPS units). When projection-based registration fails to give acceptable results, one embodiment may utilize gyroscopic sensor output to estimate y-axis translation.

Figure 9:
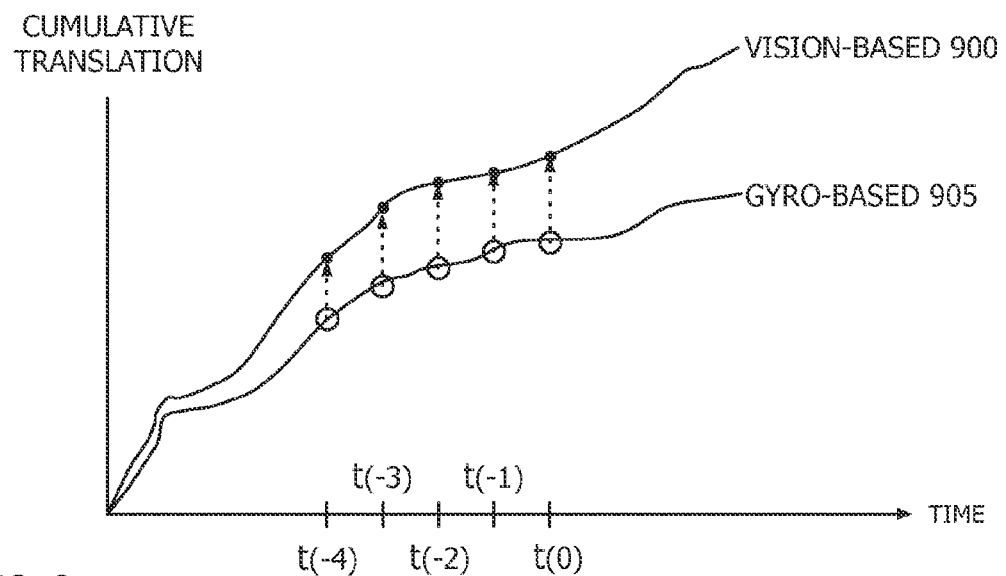
FIG. 9 shows the cumulative translation as determined by projection-based and gyroscopic sensor based output in accordance with one embodiment.

Referring to FIG. 9, the illustrative cumulative translation of an image capture device as it is moved during, for example, panoramic image capture is shown. Cumulative translation 900 shows what might be determined in accordance with projection-based methodologies as described herein. Translation 905 shows what might be determined based on typical gyroscopic sensor output. Of note is the divergence of projection-based (900) and sensor-based (905) translation predictions. At least for a gyroscopic sensor, this divergence may be due to the fact that gyroscopes measure device rotation, not device translation. As a result, any derivation of image or pixel translation from gyroscopic data will inherently become less accurate over time because of the accumulation of errors.

Figure 10:
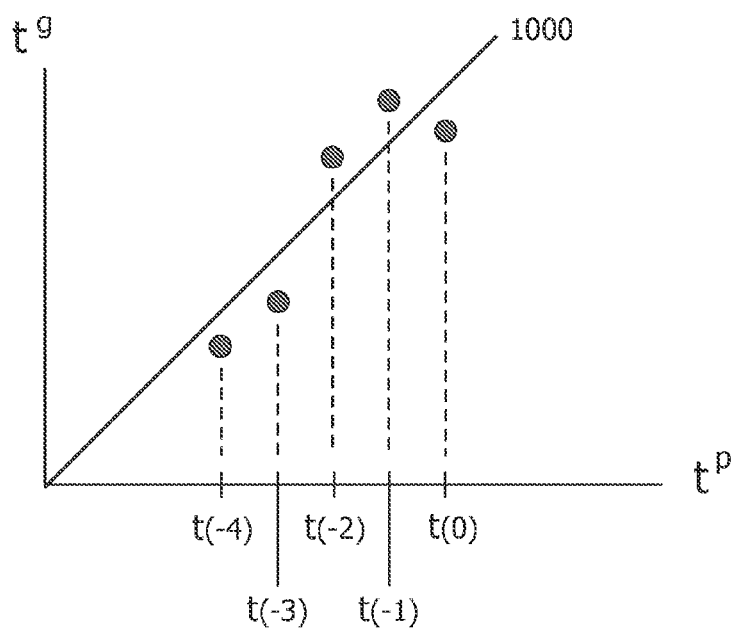
FIG. 10 shows an illustrative relation between projection- and gyroscopic-based translation estimators.

In accordance with one embodiment, the divergence or drift of gyroscopic information along the y-axis is modeled during projection-based registration operations in real-time (i.e., in the predominant direction of the image capture device's motion). In this way if projection-based operations become untrustworthy, gyroscope output may be applied to the model to generate a predicted translation—the model compensating for the inaccuracy of the gyroscope sensor output. Referring to FIG. 10, in one particular implementation the relation between projection-based cumulative translation 900 ($t^p$) and gyroscope-based cumulative translation 905 ($y^g$) may be expressed as:

$$y_p = \alpha + \beta y_g, \qquad \text{EQ. 23}$$

where $y_p$ represents the cumulative translation along the y-axis as determined by projection-based analysis as disclosed herein (e.g., 900), $y_g$ represents the cumulative translation along the y-axis as determined by gyroscopic sensor output (e.g., 905), and $\alpha$ and $\beta$ represent model parameters. In practice, each time a projection-based estimation is made, gyroscopic sensor output may be obtained and values for $\alpha$ and $\beta$ updated via, for example, linear regression techniques in accordance with EQ. 23. It has been found that only a limited number of prior estimations/measurements need be obtained in order to generate acceptable registration. In the implementation shown in FIGS. 9 and 10, for example, $\alpha$ and $\beta$ may be based on the immediately prior 5 projection estimates and their corresponding gyroscopic-based measurements. In this manner EQ. 23 may be used to estimate device translation based on sensor output. That is, sensor output $y_g$ may be applied to EQ. 23 (controlled by the parameter values $\alpha$ and $\beta$) to generate a value that is substantially equal to the projection-based translation estimators ($t^*_x$ and/or $t^*_y$). In another embodiment, the incremental (rather than cumulative) translation may be used in modeling and correction.

Figure 11:
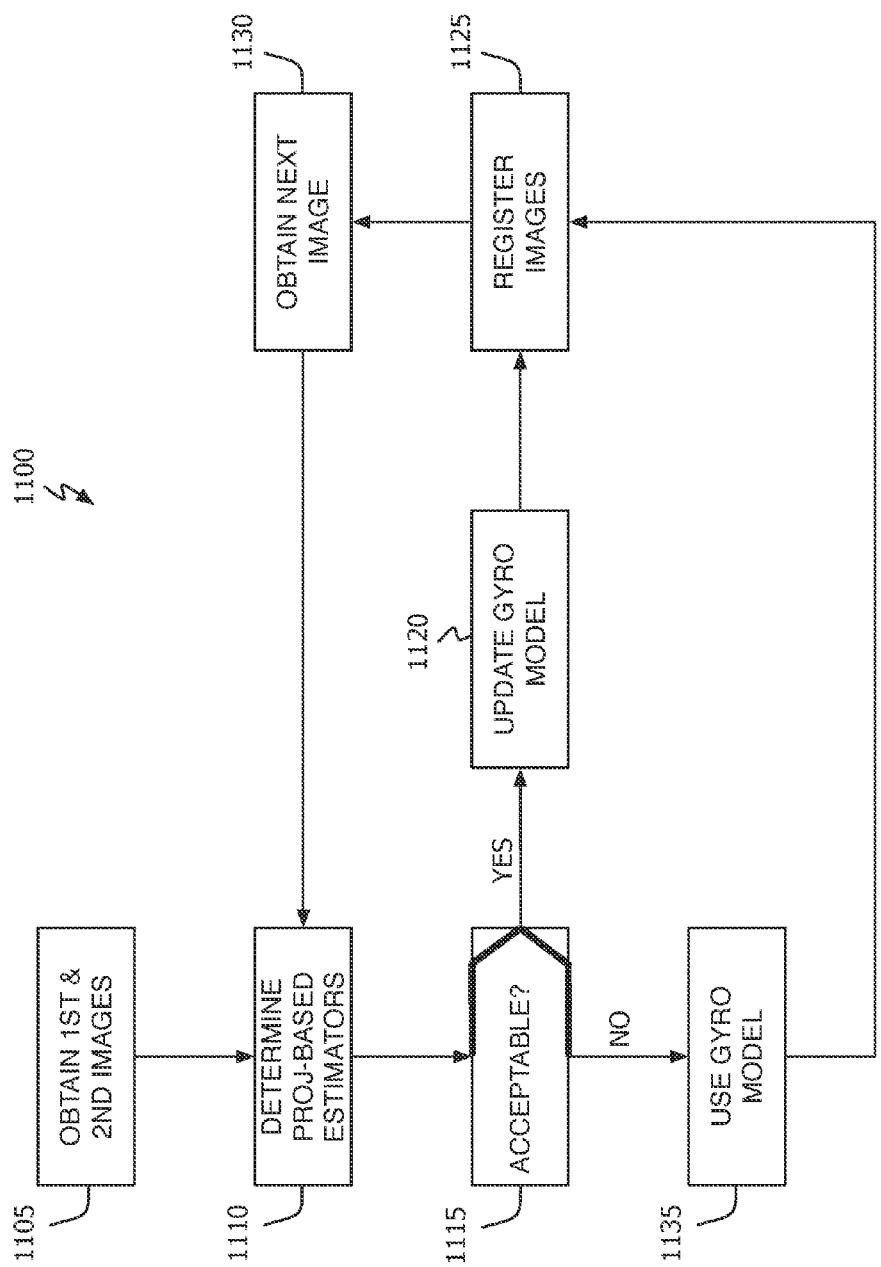
FIG. 11 shows, in flowchart form, a registration operation in accordance with one embodiment.

Referring to FIG. 11, registration operation 1100 illustrates one embodiment in which gyroscopic sensor output may be incorporated into a projection-based registration process. Initially, two images—or portions thereof—may be obtained (block 1105) and projection-based translation estimators in accordance with this disclosure determined (block 1110). A check may then be made to determine if the estimators so determined are acceptable or, in other words, meet some minimum acceptable level of quality based, for example, on the quality metrics defined by EQS. 14-16 (block 1115). If the estimators are acceptable (the "YES" prong of block 1115), the gyroscopic output model in accordance with, for example, EQ. 23 may be updated (block 1120) and the two images registered as discussed above (block 1125). The next image to be registered may be obtained (block 1130), where after operation 1100 continues at block 1110. If, on the other hand, one or more of the projection-based estimators are not acceptable (the "NO" prong of block 1115), one or more of these estimators may be ignored in favor of gyroscopic sensor output in accordance with, for example, EQ. 23 (block 1135). Continuing the illustrative embodiment begun above, because the y-axis estimator $t^*_y$ is susceptible to more error than the x-axis estimator $t^*_x$, only the y-axis estimator need be corrected in accordance with this approach. Once a y-axis estimator in accordance with block 1135 is determined, operation 1100 may continue at block 1125 as shown.

While FIG. 11 suggests that as soon as projection-based estimators are acceptable in accordance with block 1115, translation estimators are again supplied in accordance with projection-based approaches as described herein. It has been found beneficial, however, to maintain use of gyroscopic-based estimation for at least a minimum number of registration operations (e.g., 5). This prevents rapid oscillations in registration that could introduce visible registration artifacts to the user. It has also been found that when the device's actual translation is small, all points in FIG. 10 may be clumped together. When this happens calculated values for $\alpha$ and $\beta$ may be very noisy. When this is detected, registration operation 1100 can simply maintain use of the last "good" $\alpha$ and $\beta$ values.

While operations in accordance with FIGS. 9, 10 and 11 have been described in terms of estimating y-axis translation only, the above methodology is equally applicable to x-axis translation. In implementations in which motion along the y-axis is the predominant motion (i.e., generally along the direction of device motion), the described single-axis embodiment may prove sufficient. In those embodiments in which non-negligible motion occurs in the x-axis direction (i.e., motion perpendicular to the direction of device motion), or along both axes, it may be beneficial to also estimate x-axis translation based on gyroscopic sensor output.

Figure 12:
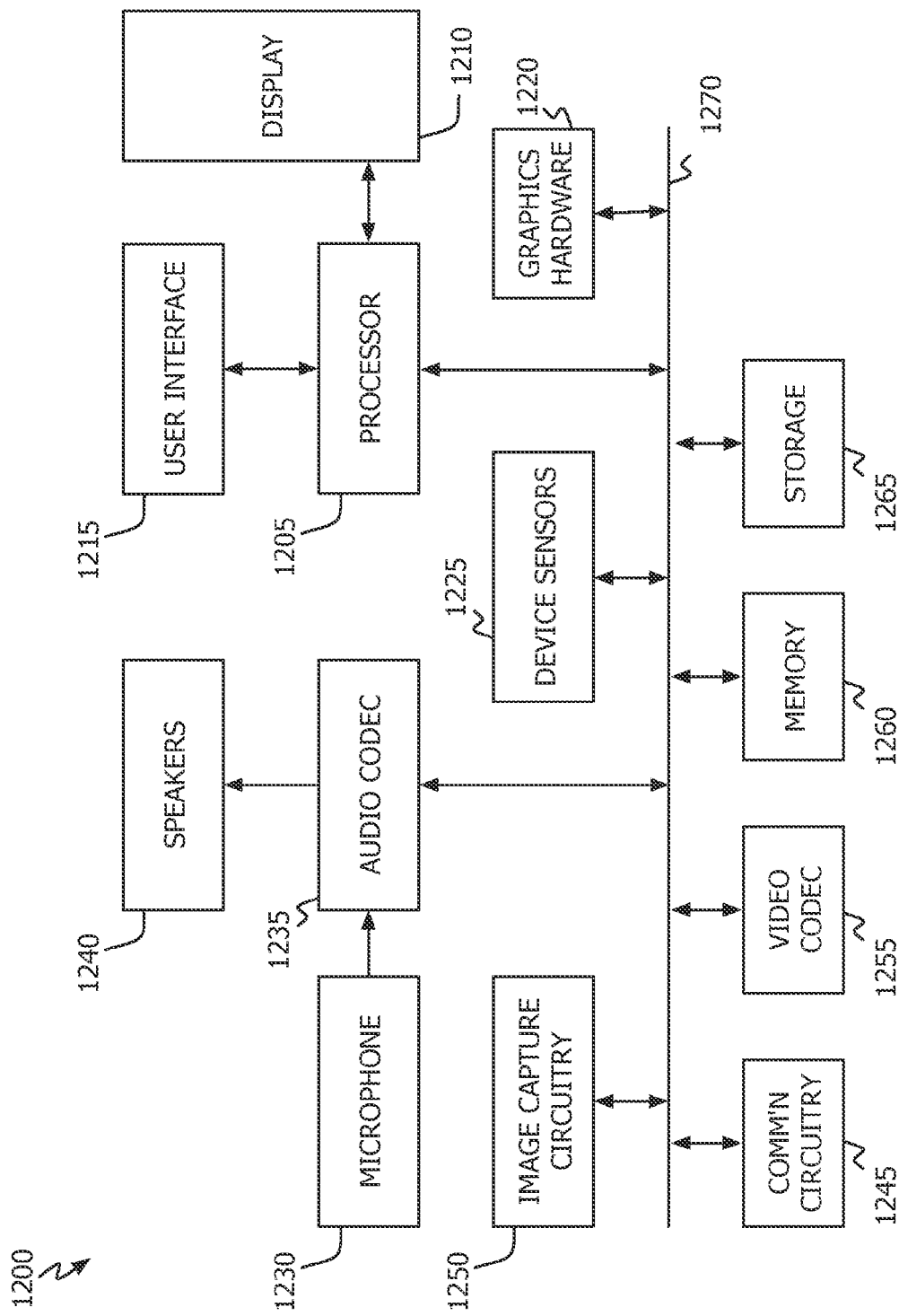
FIG. 12 shows, in block diagram form, an illustrative multifunction device including digital image capture and registration capabilities as described herein.

Referring to FIG. 12, a simplified functional block diagram of illustrative electronic device 1200 having image capture and registration capability in accordance with this disclosure is shown. Electronic device 1200 may include processor 1205, display 1210, user interface 1215, graphics hardware 1220, device sensors 1225 (e.g., proximity sensor/ambient light sensor, accelerometer, compass and/or gyroscope), microphone 1230, audio codec(s) 1235, speaker(s) 1240, communications circuitry 1245, digital image capture unit 1250, video codec(s) 1255, memory 1260, storage 1265, and communications bus 1270. Electronic device 1200 may be, for example, a personal digital assistant (PDA), personal music player, mobile telephone, or a notebook, laptop or tablet computer.

Processor 1205 may execute instructions necessary to carry out or control the operation of many functions performed by device 1200 (e.g., such as the generation and/or processing of images). Processor 1205 may, for instance, drive display 1210 and receive user input from user interface 1215. User interface 1215 may take a variety of forms, such as a button, keypad, dial, a click wheel, keyboard, display screen and/or a touch screen. Processor 1205 may also, for example, be a system-on-chip such as those found in mobile devices and include a dedicated graphics processing unit (GPU). Processor 1205 may be a general- or special-purpose programmable control device such as may be embodied by reduced instruction-set computer (RISC) or complex instruction-set computer (CISC) architectures or any other suitable architecture and may include one or more processing cores. Graphics hardware 1220 may be special purpose computational hardware for processing graphics and/or assisting processor 1205 to process graphics information. In one embodiment, graphics hardware 1220 may include a programmable graphics processing unit (GPU).

Image capture circuitry 1250 may capture still and video images that may be processed, at least in part, by video codec(s) 1255 and/or processor 1205 and/or graphics hardware 1220, and/or a dedicated image processing unit incorporated within circuitry 1250. Images so captured may be stored in memory 1260 and/or storage 1265. Memory 1260 may include one or more different types of media used by processor 1205 and graphics hardware 1220 to perform device functions. For example, memory 1260 may include memory cache, read-only memory (ROM), and/or random access memory (RAM). Storage 1265 may store media (e.g., audio, image and video files), computer program instructions or software, preference information, device profile information, and any other suitable data. Storage 1265 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1260 and storage 1265 may be used to retain computer program instructions or code organized into one or more modules and written in any desired computer programming language. When executed by, for example, processor 1205 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause the programmable control device to:
   obtain first and second images each comprising rows and columns of pixels, each pixel having a value;
   determine a first row projection and a first column projection for the first image and a second row projection and a second column projection for the second image;
   determine a derivative e for each of the first and second row projections;
   determine a derivative for each of the first and second column projections;
   determine an x-offset and a y-offset for the second image relative to the first image based, at least in part, on the derivatives of the first and second row projections and the derivatives of the first and second column projections; and
   register the second image with the first image based, at least in part, on the x-offset and a y-offset.

2. The non-transitory program storage device of claim 1, wherein the instructions to cause the programmable control device to obtain first and second images, comprise instructions to cause the programmable control device to:
   obtain first and second full-size images;
   identify a portion less than all of the first full-size image as the first image; and
   identify a portion less than all of the second full-size image as the second image.

3. The non-transitory program storage device of claim 1, wherein each pixel value in the first and second images comprise luminance pixel values.

4. The non-transitory program storage device of claim 1, wherein the instructions to cause the programmable control device to determine a first row and a first column projection for the first image and a second row and a second column projection for the second image, comprise instructions to cause the programmable control device to:
   sum the pixel values across each row of the first image to determine a first row projection;
   sum the pixel values across each column of the first image to determine a first column projection;
   sum the pixel values across each row of the second image to determine a second row projection; and
   sum the pixel values across each column of the second image to determine a second column projection.

5. The non-transitory program storage device of claim 1, further comprising instructions to cause the programmable control device to
   apply a filter to each of the found derivatives
   prior to registering the second image with the first image.

6. The non-transitory program storage device of claim 5, wherein the instructions to cause the programmable control device to determine the first and second row projections and the first and second column projections further comprise instructions to cause the programmable control device to whiten each of the first and second row projections and each of the first and second column projections.

7. The non-transitory program storage device of claim 6, wherein the instructions to cause the programmable control device to determine an x-offset and a y-offset comprise instructions to cause the programmable control device to:
   minimize a first cost function based, at least in part, on the first and second column projections to determine an x-offset; and
   minimize a second cost function based, at least in part, on the first and second row projections to determine a y-offset.

8. The non-transitory program storage device of claim 7, wherein the instructions to cause the programmable control device to minimize first and second cost functions comprise instructions to cause the programmable control device to minimize first and second normalized cost functions.

9. The non-transitory program storage device of claim 7, wherein the instructions to cause the programmable control device to minimize first and second cost functions comprise instructions to cause the programmable control device to:

minimize a first cost function based, at least in part, on the first and second row projections and a first sensor-based predictive portion; and minimize a second cost function based, at least in part, on the first and second column projections and a second sensor-based predictive portion.

10. The non-transitory program storage device of claim 7, wherein the instructions to cause the programmable control device to register the second image with the first image comprise instructions to cause the programmable control device to:

move the second image, relative to the first image, by an amount along a first axis designated by the x-offset; and move the second image, relative to the first image, by an amount along a second axis designated by the y-offset.

11. The non-transitory program storage device of claim 1, wherein the instructions to cause the programmable control device to determine an x-offset and a y-offset, further comprise instructions to cause the programmable control device to generate a quantitative quality-of-registration metric based, at least in part, on the determined x-offset and a y-offset.

12. The non-transitory program storage device of claim 11, wherein the instructions to cause the programmable control device to generate a quantitative quality-of-registration metric, comprise instructions to cause the programmable control device to:

generate a plurality of intermediate quantitative quality-of-registration metrics; and combine the plurality of intermediate quantitative quality-of-registration metrics to generate a quantitative quality-of-registration metric.

13. The non-transitory program storage device of claim 1, wherein the instructions to cause the programmable control device to determine an x-offset and a y-offset further comprise instructions to cause the programmable control device to generate a supplemental translation value based for a first axis, wherein the first axis corresponds to one of the determined x-offset and y-offset.

14. The non-transitory program storage device of claim 13, wherein the instructions to cause the programmable control device to generate a supplemental translation value comprise instructions to cause the programmable control device to:

obtain sensor output indicative of a translation along a first axis, the first axis corresponding to one of the x-offset and the y-offset; and determine one or more parameters that are indicative of a transformation of the sensor output to substantially match the determined translation along the first axis.

15. The non-transitory program storage device of claim 13, wherein the one or more parameters represent a linear relationship between the translation and the sensor output.

16. The non-transitory program storage device of claim 1, wherein the instructions to cause the programmable control device to determine a y-offset further comprise instructions to cause the programmable control device to:

partition each of the first and second images into a plurality of blocks, wherein each block in the first image has a corresponding block in the second image;

determine, for each block pair comprising a block from the first image and the corresponding block from the second image, a projection-based registration parameter along a first axis corresponding to a y-offset and a quantitative quality-of-registration metric;

update a first histogram based on the determined quantitative quality-of-registration metrics for each block pair;

update a second histogram based on a combination of each block pair's quantitative quality-of-registration metric and the projection-based registration parameter for each block pair; and determine a y-offset based, at least in part, on a combination of entries from the first and second histograms.

17. The non-transitory program storage device of claim 16, wherein the instructions to cause the programmable control device to partition each of the first and second images into a plurality of blocks comprise instructions to cause the programmable control device to:

partition the first image into a first plurality of overlapping blocks; and partition the second image into a second plurality of overlapping blocks.

18. The non-transitory program storage device of claim 17, wherein the amount of overlap between blocks comprises a predetermined value.

19. The non-transitory program storage device of claim 16, wherein the instructions to cause the programmable control device to register the second image with the first image comprise instructions to cause the programmable control device to move the second image, relative to the first image, by an amount along the first axis based, at least in part, on the one or more parameters and sensor output.

20. A non-transitory program storage device, readable by a programmable control device and comprising instructions stored thereon to cause the programmable control device to:

obtain first and second images each comprising rows and columns of pixels, each pixel having a value;

partition each of the first and second images into a plurality of blocks, wherein each block in the first image has a corresponding block in the second image;

determine, for each block pair comprising a block from the first image and the corresponding block from the second image, a quantitative quality-of-registration metric and a projection-based registration parameter along a first axis;

update a first histogram based on the determined quantitative quality-of-registration metric for each block pair;

update a second histogram based on a combination of each block pair's quantitative quality-of-registration metric and projection-based registration parameter;

determine a translation estimator along the first axis based on a combination of entries from the first and second histograms; and register the first and second images along the first axis based, at least in part, on the translation estimator.

21. The non-transitory program storage device of claim 20, wherein the instructions to cause the programmable control device to obtain first and second images of a scene comprise instructions to cause the programmable control device to:

obtain first and second expansive images;

identify a portion that is less than all of the first expansive image as the first image; and identify a portion that is less than all of the second expansive image as the second image.

22. The non-transitory program storage device of claim 20, wherein each pixel value in the first and second images comprises luminance pixel values.

23. The non-transitory program storage device of claim 20, wherein the instructions to cause the programmable control device to partition each of the first and second images into a plurality of blocks comprise instructions to cause the programmable control device to:

partition the first image into a first plurality of overlapping blocks; and partition the second image into a second plurality of overlapping blocks.

24. The non-transitory program storage device of claim 23, wherein the amount of overlap between blocks comprises a predetermined value.

25. The non-transitory program storage device of claim 20, wherein the instructions to cause the programmable control device to determine a projection-based registration parameter along a first axis comprise instructions to cause the programmable control device to:

determine a projection corresponding to the first axis for each block; and minimize a cost function for each block pair based, at least in part, on the projection for each block comprising the block pair.

26. The non-transitory program storage device of claim 25, wherein the instructions to cause the programmable control device to determine a projection for each block comprise instructions to cause the programmable control device to, for each block, sum the pixel values across each row or column corresponding to the first axis, the collection of sums being the projection.

27. The non-transitory program storage device of claim 25, wherein the instructions to cause the programmable control device to determine a quantitative quality-of-registration metric comprise instructions to cause the programmable control device to:

determine a plurality of intermediate quality metrics for each block pair; and combine each of the plurality of intermediate quality metrics for each block pair to generate a single quantitative quality-of-registration metric for each block pair.

28. The non-transitory program storage device of claim 20 wherein the instructions to cause the programmable control device to register the first and second images along the first axis further comprise instructions to cause the programmable control device to store the registered first and second images in a memory as a portion of a panoramic image.

29. A non-transitory program storage device, readable by a programmable control device and comprising instructions stored thereon to cause the programmable control device to:

obtain first and second images each comprising rows and columns of pixels, each pixel having a value;

determine a first row projection and a first column projection for the first image and a second row projection and a second column projection for the second image;

determine an x-offset for the second image relative to the first image based, at least in part, on the first and second row projections;

obtain sensor output indicative of a translation along an axis corresponding to a y-offset;

determine the y-offset based, at least in part, on the sensor output; and register the second image with the first image based, at least in part, on the x-offset and y-offset.

30. The non-transitory program storage device of claim 29, wherein the instructions to cause the programmable control device to obtain sensor output comprise instructions to cause the programmable control device to obtain gyroscopic sensor output.

31. The non-transitory program storage device of claim 29, wherein the instructions to cause the programmable control device to determine the y-offset comprise instructions to cause the programmable control device to transform the sensor output based, at least in part, on a plurality of projection-based y-offsets, wherein each of the plurality of projection-based y-offsets is determined at a time prior to a time when the sensor output was obtained.

32. The non-transitory program storage device of claim 29, wherein the instructions to cause the programmable control device to determine first and second row projections and first and second column projections comprise instructions to cause the programmable control device to:

sum the pixel values across each row of the first image to determine a first row projection;

sum the pixel values across each column of the first image to determine a first column projection;

sum the pixel values across each row of the second image to determine a second row projection; and sum the pixel values across each column of the second image to determine a second column projection.

33. The non-transitory program storage device of claim 29, wherein the instructions to cause the programmable control device to determine an x-offset for the second image relative to the first image comprise instructions to cause the programmable control device to minimize a first cost function based, at least in part, on the first and second column projections.

34. A method to register digital images, comprising:

obtaining, by a processor, first and second images each comprising rows and columns of pixels, each pixel having a value;

determining, by the processor, a first row projection and a first column projection for the first image and a second row projection and a second column projection for the second image;

determining a derivative of the first and second row projections;

determining a derivative of the first and second column projections;

determining, by the processor, an x-offset and a y-offset for the second image relative to the first image based, at least in part, on the derivatives of the first and second row projections and the derivatives of the first and second column projections; and registering, by the processor, the second image with the first image based, at least in part, on the x-offset and the y-offset.

35. A method to register digital images, comprising:

obtaining, by a processor, first and second images each comprising rows and columns of pixels, each pixel having a value;

partitioning, by the processor, each of the first and second images into a plurality of blocks, wherein each block in the first image has a corresponding block in the second image; determining, for each block pair comprising a block from the first image and the corresponding block from the second image, a quantitative quality-of-registration metric and a projection-based registration parameter along a first axis;

updating a first histogram based on the determined quantitative quality-of-registration metric for each block pair;

updating a second histogram based on a combination of each block pair's quantitative quality-of-registration metric and projection-based registration parameter;

determining a translation estimator along the first axis based on a combination of entries from the first and second histograms; and registering the first and second images along the first axis based, at least in part, on the translation estimator.

36. A method to register digital images, comprising:
- obtaining, by a processor, first and second images each comprising rows and columns of pixels, each pixel having a value;
- determining, by the processor, a first row projection and a first column projection for the first image and a second row projection and a second column projection for the second image;
- determining, by the processor, an x-offset for the second image relative to the first image based, at least in part, on the first and second row projections;
- obtaining sensor output indicative of a translation along an axis corresponding to a y-offset;
- determining, by the processor, the y-offset based, at least in part, on the sensor output; and
- registering, by the processor, the second image with the first image based, at least in part, on the x-offset and y-offset.

37. A digital device, comprising:
- a digital image capture device;
- first memory communicatively coupled to the digital image capture device;
- second memory having stored therein computer program code; and
- one or more processors communicatively coupled to the first and second memories and adapted to execute the computer program code so as to—
  - obtain first and second images each comprising rows and columns of pixels, each pixel having a value,
  - determine a first row projection and a first column projection for the first image and a second row projection and a second column projection for the second image,
  - determine a derivative for each of the first and second row projections,
  - determine a derivative for each of the first and second column projections,
  - determine an x-offset and a y-offset for the second image relative to the first image based, at least in part, on the derivatives of the first and second row projections and the derivatives of the first and second column projections, and
  - register the second image with the first image based, at least in part, on the x-offset and the y-offset.

38. A digital device, comprising:
- a digital image capture device;
- first memory communicatively coupled to the digital image capture device;
- second memory having stored therein computer program code; and
- one or more processors communicatively coupled to the first and second memories and adapted to execute the computer program code so as to—
  - obtain first and second images each comprising rows and columns of pixels, each pixel having a value,
  - partition each of the first and second images into a plurality of blocks, wherein each block in the first image has a corresponding block in the second image,
  - determine, for each block pair comprising a block from the first image and the corresponding block from the second image, a quantitative quality-of-registration metric and a projection-based registration parameter along a first axis,
  - update a first histogram based on the determined quantitative quality-of-registration metric for each block pair,
  - update a second histogram based on a combination of each block pair's quantitative quality-of-registration metric and projection-based registration parameter,
  - determine a translation estimator along the first axis based on a combination of entries from the first and second histograms, and
  - register the first and second images along the first axis based, at least in part, on the translation estimator.

39. A digital device, comprising:
- a digital image capture device;
- first memory communicatively coupled to the digital image capture device;
- second memory having stored therein computer program code; and
- one or more processors communicatively coupled to the first and second memories and adapted to execute the computer program code so as to—
  - obtain first and second images each comprising rows and columns of pixels, each pixel having a value,
  - determine a first row projection and a first column projection for the first image and a second row projection and a second column projection for the second image,
  - determine an x-offset for the second image relative to the first image based, at least in part, on the first and second row projections;
  - obtain sensor output indicative of a translation along an axis corresponding to a y-offset,
  - determine the y-offset based, at least in part, on the sensor output, and
  - register the second image with the first image based, at least in part, on the x-offset and y-offset.

* * * * *